US008422555B2

(12) United States Patent
Wang et al.

(10) Patent No.: US 8,422,555 B2
(45) Date of Patent: Apr. 16, 2013

(54) SCALABLE VIDEO CODING (75) Inventors: Xianglin Wang, Santa Clara, CA (US); Justin Ridge, Sachse, TX (US)

(73) Assignee: Nokia Corporation, Espoo (FI)

( * ) Notice: Subject to any disclaimer, the term of this patent is extended or adjusted under 35 U.S.C. 154(b) by 1493 days.

(21) Appl. No.: 11/775,129

(22) Filed: Jul. 9, 2007

(65) Prior Publication Data

US 2008/0056356 A1 Mar. 6, 2008

Related U.S. Application Data (60) Provisional application No. 60/830,361, filed on Jul. 11, 2006, provisional application No. 60/852,043, filed on Oct. 16, 2006.

(51) Int. Cl.
*H04N 7/12* (2006.01)

(52) U.S. Cl.
USPC ............ 375/240.12; 375/240.01; 375/240.11; 375/240.13; 375/240.14; 375/240.15; 375/240.16; 375/240.17; 375/240.18

(58) Field of Classification Search ............. 375/240.12, 375/240.01–240.18
See application file for complete search history.

(56) References Cited

U.S. PATENT DOCUMENTS

| 6,157,676 | A | * | 12/2000 | Takaoka et al. | 375/240.13 |
| 6,173,013 | B1 | * | 1/2001 | Suzuki et al. | 375/240.16 |
| 6,292,512 | B1 | * | 9/2001 | Radha et al. | 375/240.1 |
| 6,999,627 | B2 | * | 2/2006 | MacDonald et al. | 382/238 |
| 2004/0264570 | A1 | * | 12/2004 | Kondo et al. | 375/240.16 |
| 2005/0157797 | A1 | * | 7/2005 | Gaedke | 375/240.24 |
| 2006/0120448 | A1 | | 6/2006 | Han et al. | |
| 2006/0133485 | A1 | * | 6/2006 | Park et al. | 375/240.08 |
| 2006/0153300 | A1 | * | 7/2006 | Wang et al. | 375/240.16 |
| 2007/0121723 | A1 | | 5/2007 | Mathew et al. | |
| 2007/0160133 | A1 | * | 7/2007 | Bao et al. | 375/240.1 |
| 2007/0230575 | A1 | | 10/2007 | Han | |

FOREIGN PATENT DOCUMENTS

| EP | 0644695 | | 3/1995 |
| EP | 0644695 | A2 * | 9/2004 |
| EP | 1715693 | | 10/2006 |
| EP | 1715693 | A2 * | 10/2006 |
| KR | 1020060063533 | A | 6/2006 |
| KR | 1020070056896 | A | 6/2007 |
| KR | 1020070099390 | A | 9/2007 |

(Continued)

OTHER PUBLICATIONS

WO2008007342A3, PCT Report, Jun. 2008.*

(Continued)

*Primary Examiner* — Mehrdad Dastouri
*Assistant Examiner* — Shan Elahi
(74) *Attorney, Agent, or Firm* — Alston & Bird LLP (57) ABSTRACT A system and method for predicting an enhancement layer macroblock. A base layer frame is divided into intra-coded and inter-coded regions. If any portion of the enhancement layer macroblock is covered by both an intra-coded base layer macroblock and an inter-coded base layer macroblock, predictions utilizing the intra-coded and inter-coded macroblocks are established independently to generate at least two prediction values. The at least two prediction values are then combined to give a prediction from which the enhancement layer block is coded. Various embodiments serve to smooth the boundary effect between intra-coded regions and inter-coded regions inside the inter-layer prediction for extended spatial scalability.

28 Claims, 7 Drawing Sheets

FOREIGN PATENT DOCUMENTS

| WO | WO 99/33274 | | 7/1999 |
|---|---|---|---|
| WO | WO9933274 A1 | * | 7/1999 |
| WO | 2006/044370 A1 | | 4/2006 |
| WO | WO 2007/040370 | | 4/2007 |
| WO | WO 2008/004940 | | 1/2008 |

OTHER PUBLICATIONS

Espacenet search result, Espacent Result List, Jul. 2011.*
Office Action in Chinese Patent Application No. 200780031559.9 dated Sep. 21, 2011.
English Translation of Office Action in Chinese Patent Application No. 200780031559.9 dated Sep. 21, 2011.
International Search Report for PCT/IB2007/052757, Apr. 15, 2008.
Notice of Allowance of Patent for KR Patent Application No. 10-2009-702407, dated May 4, 2011.
English translation of Notice of Allowance of Patent for KR Patent Application No. 10-2009-702407, dated May 4, 2011.
Office Action from Chinese Patent Application No. 200780031559.9, dated Jul. 2, 2012.
Supplemental European Search Report for Patent Application No. 07805109.1, dated Aug. 4, 2011.
Marquant, G. et al., "Extended Spatial Scalability for Non Dyadic Video Formats: from SDTV to HDTV", Visual Communications and Image Processing, Proc. of SPIE, vol. 5960, pp. 547-558, Jul. 12, 2005.
JVT: "Joint Scalable Video Model JSVM-6", ITU Study Group 16—Video Coding Experts Group—ISO/IEC MPEG & ITU-T VCEG(ISO/IEC JTC1/SC29/WG11 and ITU-T SG16 Q6), Jun. 8, 2006.
Wang, Xianglin et al, "Improved inter-layer prediction for ESS", ITU Study Group 16—Video Coding Experts Group—ISO/IEC MPEG & ITU-T VCEG(ISO/IEC JTC1/SC29/WG11 and ITU-T SG16 Q6), Jul. 15, 2006.

* cited by examiner

SCALABLE VIDEO CODING

CROSS-REFERENCE TO RELATED APPLICATIONS

The present application claims priority to U.S. Provisional Patent Application No. 60/830,361, filed Jul. 11, 2006 and U.S. Provisional Patent Application No. 60/852,043, filed Oct. 16, 2006.

FIELD OF THE INVENTION

The present invention relates to the field of video coding. More specifically, the present invention relates to a system and method of dividing a base layer into intra-coded and inter-coded regions, establishing inter-layer predictions independently, and combining the predictions to give a relative prediction from which an enhancement layer macroblock is coded.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also know as ISO/IEC MPEG-4 AVC). In addition, there are currently efforts underway with regards to the development of new video coding standards. One such standard under development is the scalable video coding (SVC) standard, which is expected to become the scalable extension to the H.264/AVC standard as Annex G (previously Annex F). (It should also be understood that SVC may ultimately appear in a different Annex of the final standard.) Another such effort involves the development of China video coding standards.

Annex G introduces a feature known as extended spatial scalability, which includes cases where the edge alignment of a base layer macroblock and an enhancement macroblock is not maintained. A spatial scaling ratio of 1 or 2 with aligned macroblock edges across different layers is considered a special case of spatial scalability.

As used herein, the term "enhancement layer" refers to a layer that is coded differentially compared to some lower quality reconstruction. The purpose of the enhancement layer is that, when added to the lower quality reconstruction, signal quality should improve, or be "enhanced." Further, the term "base layer" applies to both a non-scalable base layer encoded using an existing video coding algorithm, and to a reconstructed enhancement layer relative to which a subsequent enhancement layer is coded.

In SVC, a video sequence can be coded in multiple layers, and each layer is one representation of the video sequence at a certain spatial resolution or temporal resolution or at a certain quality level or some combination of the three. A portion of a scalable video bitstream can be extracted and decoded at a desired spatial resolution, temporal resolution, certain quality level or some combination of these resolutions. A scalable video bitstream contains a non-scalable base layer and one or more enhancement layers.

In SVC coding, as the codec is based on a layer approach to enable spatial scalability, the encoder provides a down-sampling filter stage that generates the lower resolution signal for each spatial layer. In its basic version, the down-sampling ratio is equal to 2 (the base layer resolution is half the spatial resolution of its spatial enhancement layer). Extended Spatial Scalability (ESS) generalizes this concept by enabling the base layer to be a cropped version of its enhancement layer with a down-sampling ratio different from 1 or 2, thus enabling a generalized relation between successive spatial layers. A picture of a lower spatial layer may represent a cropped area of the higher resolution picture and the relation between successive spatial layers does not need to be dyadic. Geometrical parameters defining the cropping window and the down-sampling ratio can either be defined at the sequence level, or evolve at the picture level.

ESS may result in a situation wherein the edge alignment of a base layer macroblock (MB) and an enhancement layer MB is not maintained after the upsampling process. When spatial scaling is performed with a ratio of 1 or 2 and a MB edge is aligned across different layers, it is considered to be a special case of spatial scalability.

Figure 1:
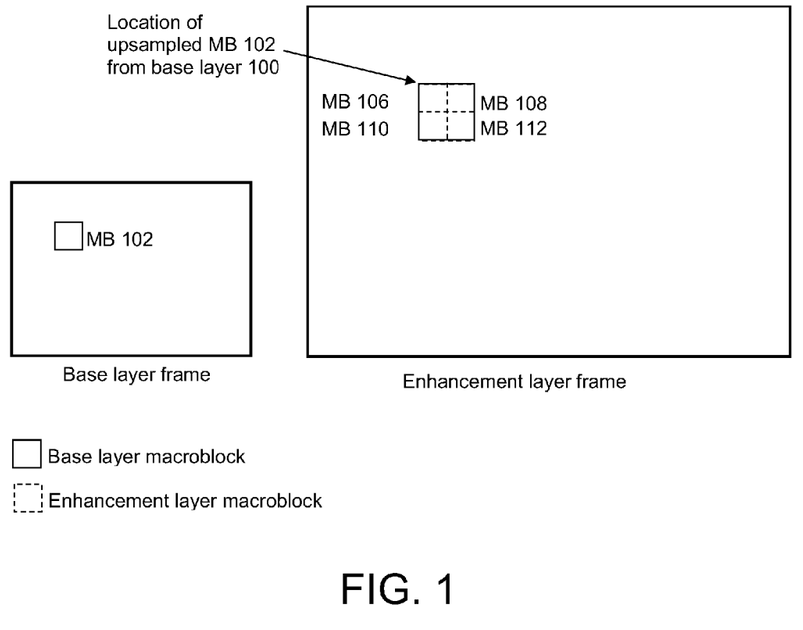
FIG. 1 is a schematic representation of dyadic resolution scaling capable of being performed in various embodiments of the present invention.

For example, when utilizing dyadic resolution scaling (i.e., scaling resolution by a power of 2), the edge alignment of MBs can be maintained. This example is illustrated in FIG. 1 where a half-resolution frame (i.e., base layer frame 100) is associated with an upsampled, full resolution version (i.e., enhancement layer frame 104). An MB 102, which comprises at least a portion of the base layer frame 100, is shown. The boundary of the MB 102 seen in the base layer frame 100 is "maintained" so that even after upsampling to give the enhancement layer 104, the boundary still, exactly encompasses four full-resolution MBs, i.e., MB 106, MB 108, MB 110, and MB 112. In other words, the edges of the four enhancement layer MBs 106, 108, 110, and 112 exactly correspond to the upsampled boundary of the MB 102. Importantly, the only base layer MB covering each of the enhancement layer MBs, i.e., MB 106, MB 108, MB 110, and MB 112, is MB 102. Therefore, no other base layer MB is necessary to form the prediction for MB 106, MB 108, MB 110, and MB 112.

Figure 2:
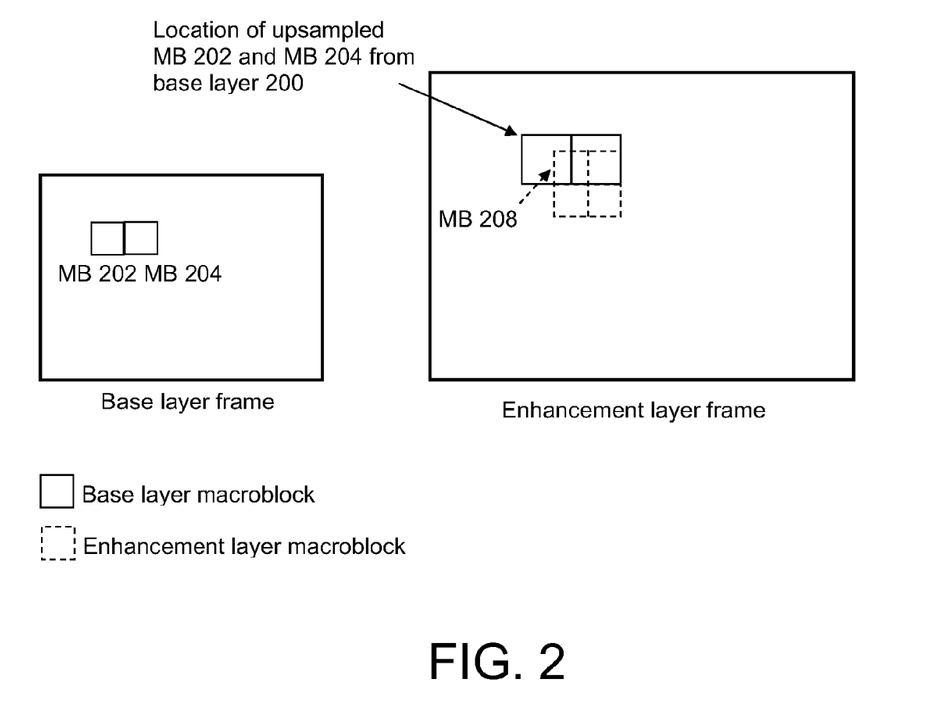
FIG. 2 is a schematic representation of non-dyadic resolution capable of being performed in various embodiments of the present invention.

FIG. 2 illustrates a non-dyadic scalability scenario where the scaling factor is 1.5. In this scenario, base layer MBs, i.e., MB 202 and MB 204 of base layer 200 will be upsampled from 16×16 to 24×24 shown in higher resolution enhancement layer 206. Enhancement layer MB 208 (outlined by dotted lines), is shown to be covered by two different upsampled MBs, i.e. MB 202 and MB 204. Thus, the two base layer MBs, i.e., MB 202 and MB 204, are required in order to form a prediction for the enhancement layer MB 208. It should be noted that depending upon the scaling factor, a single enhancement layer MB may be covered by up to four base layer MBs. In the current draft of Annex G of the H.264/AVC standard, an enhancement layer macroblock can be coded relative to the base layer, even though several base layer macroblocks may be needed to form the prediction.

In the current draft of Annex G, it is possible that an enhancement layer MB is coded relative to an associated base layer frame, even though several base layer MBs may be needed to form the prediction. Because coding efficiency is closely related to prediction accuracy, it is desirable to form an accurate prediction of the enhancement layer MB to improve coding efficiency

SUMMARY OF THE INVENTION

Various embodiments of the present invention comprise a system and method for predicting an enhancement layer macroblock when the enhancement layer macroblock is covered by at least one intra-coded base layer macroblock and at least one inter-coded base layer macroblock. In one embodiment of the present invention, a base layer frame is divided into intra-coded and inter-coded regions, after which predictions are established independently and then combined to give a prediction from which the enhancement layer block is encoded in a scalable bit stream. In an alternative embodiment of the present invention, a decoder decodes a scalable bit stream comprising an enhancement layer macroblock, where the enhancement layer macroblock comprises independently established predictions derived from intra-coded and inter-coded base layer macroblocks. In yet another embodiment of the present invention, a prediction value for an enhancement layer macroblock is created from a virtual base layer macroblock. A further check is performed to see if any intra-coded base layer macroblocks, from which the virtual base layer macroblock may have been derived, cover at least a portion of the enhancement layer macroblock. If an intra-coded base layer macroblock exists, reconstructed and upsampled values from the intra-coded base layer macroblock are used to replace the virtual base layer macroblock prediction for the portion of the enhancement layer macroblock covered by the intra-coded base layer macroblock.

By allowing both different portions of an enhancement layer macroblock to be predicted by their associated intra-coded and inter-coded base layer macroblocks, more accurate predictions can result. In addition, coding efficiency is improved.

Various embodiments also provide for a system and method of further improving prediction quality for video coding with ESS, resulting in improvements of visual quality and coding efficiency. When dividing a virtual base layer macroblock into intra-coded and inter-coded regions, predictions are established independently and are combined to give the prediction of the current enhancement layer macroblock. In this case, there can be a clear boundary (or discontinuity in pixel values) between intra-coded regions and inter-coded regions in the prediction of the current enhancement layer macroblock. Such a boundary may not only affect visual quality of coded video, but also penalize coding efficiency due to the fact that boundary (i.e. image edge area) general contains more high frequency component which that is less friendly for compression. In various embodiments of the present invention, methods are provided for smoothing the boundary effect. In one embodiment, a filtering operation is performed across the boundary between intra-coded regions and inter-coded regions.

In another embodiment, for an enhancement layer macroblock that is covered with both intra-MBs and inter-MBs from the base layer, the whole macroblock is first treated as being covered solely by inter-MBs from base layer and a first inter-layer prediction can be obtained accordingly. For intra-coded regions, a second prediction can then be derived using reconstructed and upsampled intra-MBs from base layer. A blending operation is then performed in the intra-coded region between the first prediction and the second prediction so that the boundary effect between intra-coded regions and inter-coded regions can be smoothed. In still another embodiment, the boundary of an intra-coded region is rounded to the nearest coding block (e.g. 4×4 block) boundary. Inter-layer prediction is then obtained separately for the intra-coded region and the inter-coded region. In this case, due to the fact that the boundary between intra-coded region and inter-coded region is aligned with coding block boundary, the boundary effect can be smoothed out by a loop filter operation performed on each coding block boundary.

These and other features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE VARIOUS EMBODIMENTS

According to the present invention, when an enhancement layer MB is covered by multiple base layer MBs that include at least, both an intra-coded MB and an inter-coded MB, the area of the enhancement layer MB that is covered by the intra-coded MB from a base layer frame uses the reconstructed and upsampled base layer frame for prediction. In addition, the residual prediction (described below) is used to form the prediction for the remaining area of the enhancement layer MB that is covered by the inter-coded MB from the base layer frame. It should be noted that the term MB refers to a number of blocks as specified by a selected macroblock mode and the number can be one or more.

Figure 3:
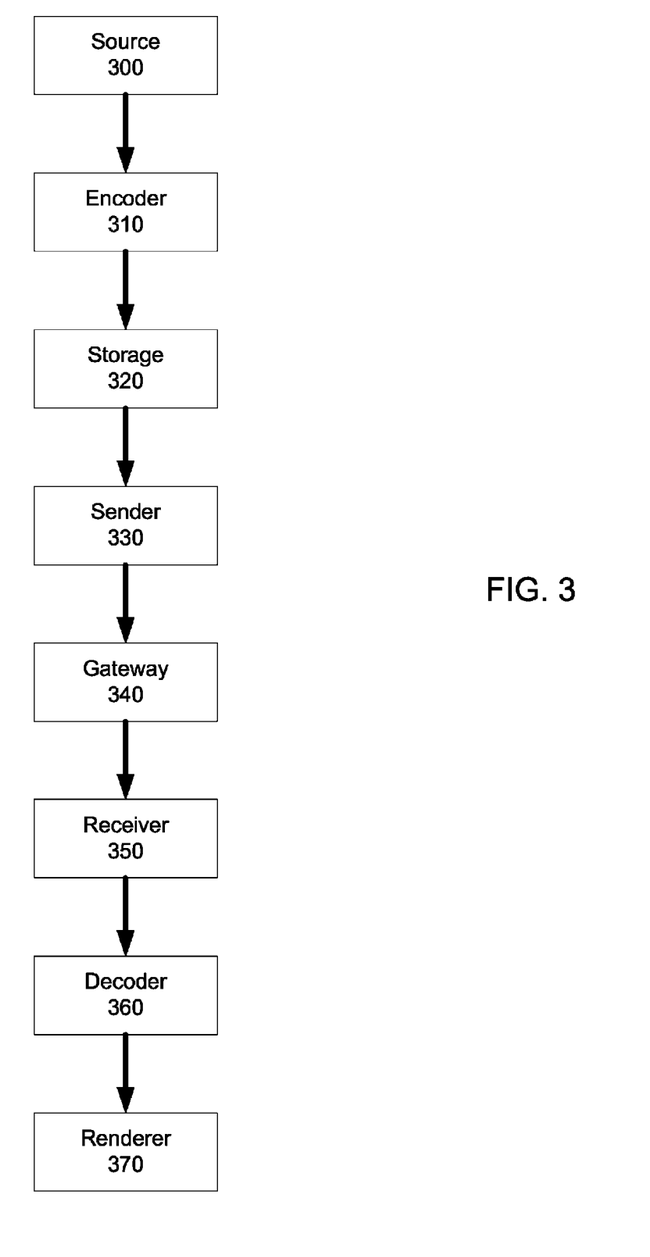
FIG. 3 is an overview diagram of a system within which the present invention may be implemented.

FIG. 3 shows a generic multimedia communications system for use with the present invention. As shown in FIG. 3, a data source 300 provides a source signal in an analog, uncompressed digital, or compressed digital format, or any combination of these formats. An encoder 310 encodes the source signal into a coded media bitstream. The encoder 310 may be capable of encoding more than one media type, such as audio and video, or more than one encoder 310 may be required to code different media types of the source signal. The encoder 310 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 310 is considered to simplify the description without a lack of generality.

The coded media bitstream is transferred to a storage 320. The storage 320 may comprise any type of mass memory to store the coded media bitstream. The format of the coded media bitstream in the storage 320 may be an elementary self-contained bitstream format, or one or more coded media bitstreams may be encapsulated into a container file. Some systems operate "live", i.e. omit storage and transfer coded media bitstream from the encoder 310 directly to the sender 330. The coded media bitstream is then transferred to the sender 330, also referred to as the server, on a need basis. The format used in the transmission may be an elementary self-contained bitstream format, a packet stream format, or one or more coded media bitstreams may be encapsulated into a container file. The encoder 310, the storage 320, and the sender 330 may reside in the same physical device or they may be included in separate devices. The encoder 310 and sender 330 may operate with live real-time content, in which case the coded media bitstream is typically not stored permanently, but rather buffered for small periods of time in the content encoder 310 and/or in the sender 330 to smooth out variations in processing delay, transfer delay, and coded media bitrate.

The sender 330 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 330 encapsulates the coded media bitstream into packets. For example, when RTP is used, the sender 330 encapsulates the coded media bitstream into RTP packets according to an RTP payload format. Typically, each media type has a dedicated RTP payload format. It should be again noted that a system may contain more than one sender 330, but for the sake of simplicity, the following description only considers one sender 330.

The sender 330 may or may not be connected to a gateway 340 through a communication network. The gateway 340 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 340 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 340 is called an RTP mixer and acts as an endpoint of an RTP connection.

The system includes one or more receivers 350, typically capable of receiving, de-modulating, and de-capsulating the transmitted signal into a coded media bitstream. The coded media bitstream is typically processed further by a decoder 360, whose output is one or more uncompressed media streams. Finally, a renderer 370 may reproduce the uncompressed media streams with a loudspeaker or a display, for example. The receiver 350, decoder 360, and renderer 370 may reside in the same physical device or they may be included in separate devices.

It should be understood that, although text and examples contained herein may specifically describe an encoding process, one skilled in the art would readily understand that the same concepts and principles also apply to the corresponding decoding process and vice versa. It should be noted that the bitstream to be decoded can be received from a remote device located within virtually any type of network. Additionally, the bit stream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like. It should be noted that the various embodiments of the present invention can be implemented directly in software using any common programming language, e.g. C/C++ or assembly language.

Figure 4:
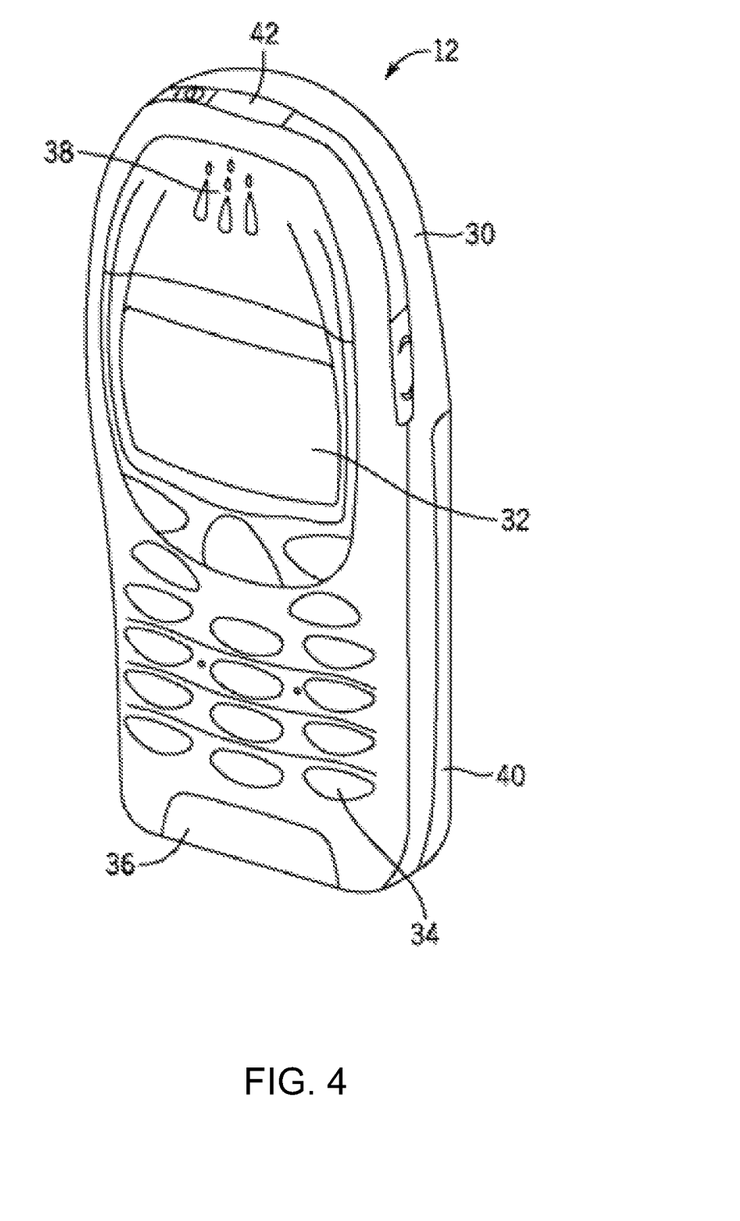
FIG. 4 is a perspective view of a mobile device that can be used in the implementation of the present invention.
Figure 5:
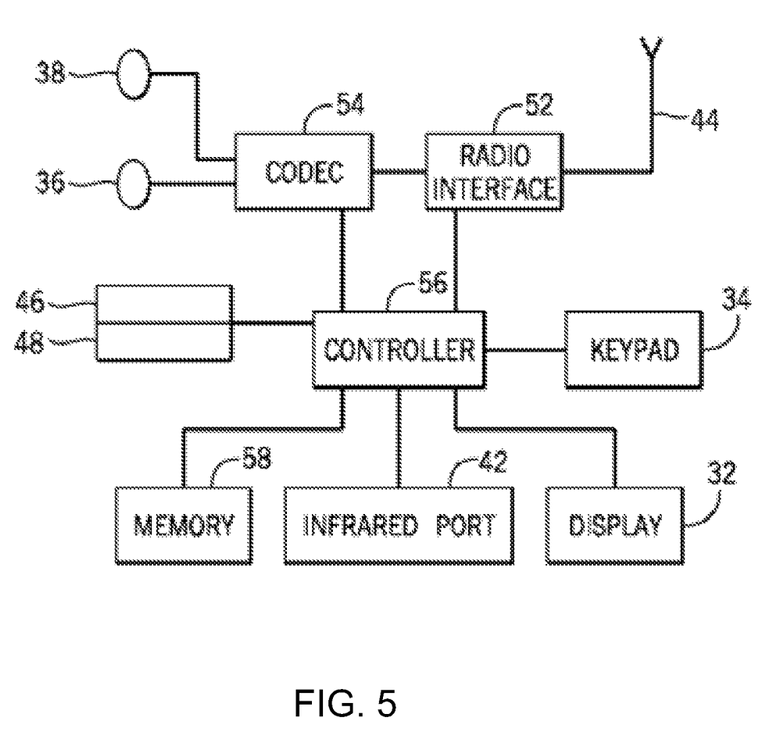
FIG. 5 is a schematic representation of the circuitry of the mobile device of FIG. 4.

FIGS. 4 and 5 show one representative mobile device 12 within which the present invention may be implemented. It should be understood, however, that the present invention is not intended to be limited to one particular type of mobile device 12 or other electronic device. Some or all of the features depicted in FIGS. 4 and 5 could be incorporated into any or all devices that may be utilized in the system shown in FIG. 3.

The mobile device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile devices.

As discussed above, according to the current draft of Annex G of H.264/AVC, intra-coded MBs from a base layer are fully decoded and reconstructed so that they may be conventionally upsampled and used to directly predict associated enhancement layer MBs. However, for inter-layer prediction, inter-coded MBs from the base layer are not fully decoded and reconstructed. Instead, only the prediction residual of each base layer inter-coded MB is decoded and may be used to predict the enhancement layer prediction residual. No motion compensation is done on the base layer inter-coded MB to predict the enhancement layer. This process is referred to as "residual prediction". For an inter-coded MB, base layer motion vectors are also upsampled and used to predict enhancement layer motion vectors.

Figure 6:
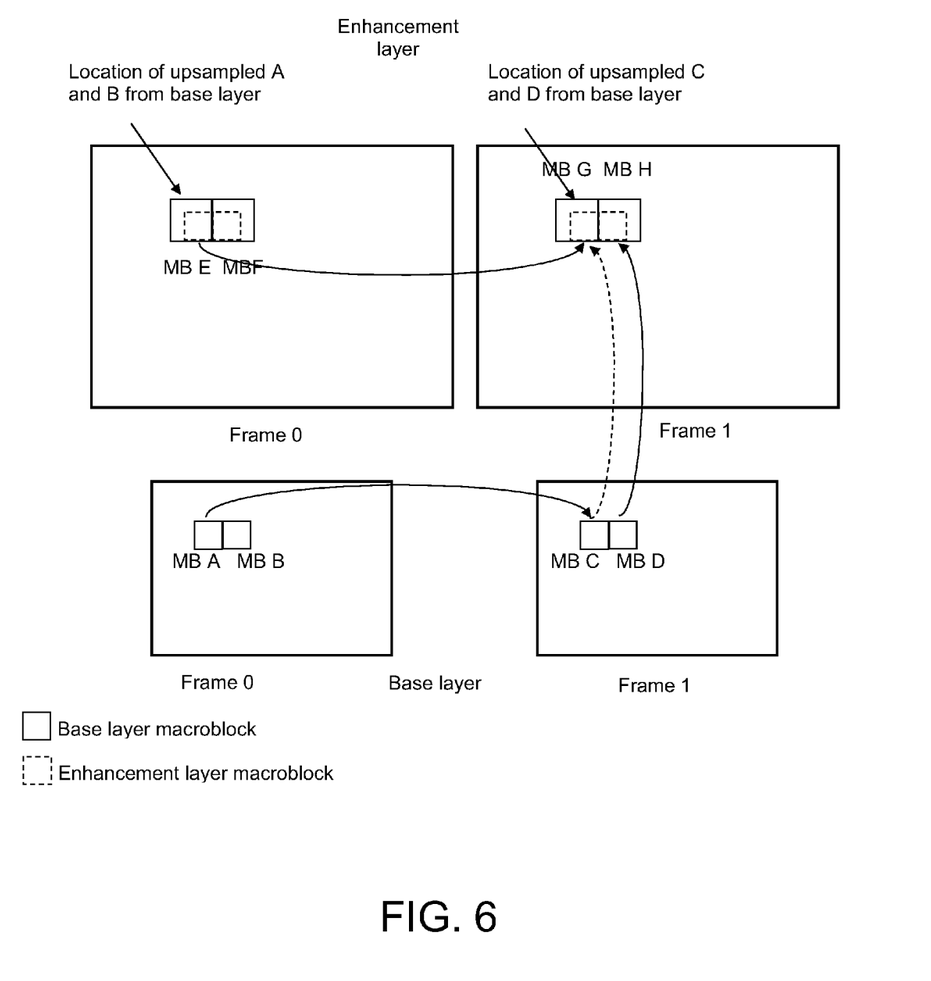
FIG. 6 is a schematic representation showing the distinction between conventional upsampling and residual prediction utilized by various embodiments of the present invention.

The distinction between conventional upsampling and residual prediction is illustrated in FIG. 6. Each enhancement layer MB, i.e., MB E, MB F, MB G, and MB H, has only one base layer MB, i.e., MB A, MB B, MB C, and MB D respectively. Assuming that the base layer MB D is intra-coded, the enhancement layer MB H can take the fully reconstructed and upsampled version of the MB D as a prediction, and it is coded as the residual between the original MB H, noted as O(H), and the prediction from the base layer MB D. Using "U" to indicate the upsampling function and "R" to indicate the decoding and reconstruction function, the residual can be represented by O(H)−U(R(D)).

By contrast, assume the MB C is inter-coded. If the MB C is coded relative to a prediction from A, represented by $P_{AC}$, according to residual prediction, a prediction of G based on E is represented by $P_{EG}$. Thus, the MB G can be coded as $O(G)-P_{EG}-U(O(C)-P_{AC})$. Here, $U(O(C)-P_{AC})$ is simply the upsampled residual from the MB C that is decoded from the bit stream. It should be noted that a subtractor (not shown in FIG. 3) can generate a residual signal or residual MB, by subtracting a predicted MB on a predicted signal path from an input MB on an input signal path.

This coding structure is complimentary to single-loop decoding, i.e., it is desirable to only perform complex motion compensation operations for one layer, regardless of which layer is to be decoded. In other words, to form an inter-layer prediction for an enhancement layer, there is no need to do motion compensation at the associated base layer. This implies that inter-coded MBs in the base layer are not fully reconstructed, and therefore fully reconstructed values are not available for inter-layer prediction. Referring again to FIG. 6, R(C) is not available when decoding G. Therefore, coding $O(G)-U(R(C))$ is not an option.

In practice, the residual prediction mentioned above can be performed in an adaptive manner. When a base layer residual does not help in coding a certain MB, prediction can be done in a traditional manner. Using the MB G in FIG. 6 as an example, without using a base layer residual, the MB G can be coded as $O(G)-P_{EG}$. In this case, the upsampled base layer motion vectors may still be used to predict enhancement layer motion vectors. In the following description, the term residual prediction refers to this adaptive manner.

As discussed above, for extended spatial scalability (ESS), a single enhancement layer MB may be covered by up to four base layer MBs. In addition, not all base layer MBs are necessarily of the same type. For example, referring back to FIG. 2, the MB 202 might be inter-predicted (i.e., an "inter-coded MB") and the MB 204 might be intra-predicted (i.e., an "intra-coded MB"). In this example, inter-layer prediction is accomplished as follows: In the current draft of Annex G of the H.264/AVC video coding standard, when enhancement layer MBs are not edge-aligned with base layer MBs, for each enhancement layer MB, a virtual base layer MB is derived, based on the base layer MBs that cover the enhancement layer MB. The type, the MB mode, and the motion vectors of the virtual base layer MB are all determined based on the base layer MBs that cover the current enhancement layer MB. An inter-layer prediction is formed for the current enhancement layer MB based on the virtual base layer MB according to the process described above, as if the virtual base layer MB is the only base layer MB for the current enhancement layer MB.

It should be noted that in this case, how the virtual base layer MB is formed (i.e., determining its type, mode, motion vectors, etc.) can greatly affect the quality of the inter-layer prediction formed for a given enhancement layer MB. As a result, the formation of the virtual base layer MB also affects coding efficiency.

According to the current draft of Annex G of the H.264/AVC video coding standard, provided at least one base layer MB that covers a given enhancement layer MB is inter-coded, the virtual base layer MB type will be designated to be inter-coded. In this case, only residual prediction is performed in forming the inter-layer prediction. When all base layer MBs that cover a given enhancement layer MB are intra-coded, the type of virtual base layer MB is designated as being intra-coded.

The practical consequence of this approach is that some intra-coded MBs will be treated as inter-coded. In the above example referring to FIG. 2, if the MB 202 is an inter-coded MB and the MB 204 is an intra-coded MB, when forming the prediction for MB 208, both MB 202 and MB 204 would be treated as inter-coded MBs. The fundamental problem with this approach is that for the region of a MB covered by a base-layer intra-coded MB, an alternative prediction is ignored, i.e., the upsampled version of the reconstructed base layer. In the example of FIG. 2, the upsampled version of the MB 204 would be ignored when forming the prediction of the MB 208 even though it is available.

Meanwhile, since the MB 204 does not have motion vectors, a motion vector has to be derived for the area of the MB 208 that is covered by the MB 204 and then a residual prediction for that area is obtained. The derivation of such a motion vector is based on the neighboring motion vectors of the MB 204 at the base layer 200. The problem is that if the MB 204 is intra-coded, such a derived motion vector often does not suit the MB 204 well. Therefore, when such motion vectors are used, the prediction formed for the enhancement layer 206 is also of poor quality.

Because the reconstructed and upsampled values from an intra-coded base layer MB are likely to be a better prediction than a corresponding residual prediction, excluding the upsampled base layer statistically worsens the prediction of the enhancement layer, leading to a drop in coding efficiency.

To get an inter-layer prediction for an enhancement layer MB when enhancement layer MBs and base layer MBs are not edge-aligned, a more accurate method that can be utilized is to perform a pixel-based prediction. More specifically, each pixel in the enhancement layer MB has one MB from a base layer that covers it. If the base layer MB is an intra-coded MB, the prediction of a current pixel is the corresponding reconstructed and upsampled pixel value from the base layer. If the base layer MB is an inter-coded MB, the motion vectors of the MB that cover the given pixel are considered to be base layer motion vectors for the given pixel and residual prediction can be performed to get a prediction value for the given pixel. However, the problem with such a method is that it has a high complexity and therefore, is not practical.

As explained above, in the current draft of Annex G of the H.264/AVC video coding standard, when enhancement layer MBs and base layer MBs are not edge-aligned, a virtual base layer MB is derived based on the base layer MBs that cover the enhancement layer MB. The type, the MB mode and the motion vectors of the virtual base layer MB are all determined based on these base layer MBs. Then a prediction can be obtained for the enhancement layer MB based on the virtual base layer MB.

One motivation for having such a virtual base layer MB is to be able to use the standard motion compensation process that is based on some defined MB modes. An MB mode specifies how an MB is further divided into blocks whose size can range from 16×16 down to 4×4 pixels. Pixels in each block share common motion vectors. Since a virtual base layer MB is not defined any differently than a regular MB, standard motion compensation process can be applied to get the prediction. Such a method has a relatively low complexity. However, it is less accurate than pixel-based prediction due to the fact that pixels in each block have to share common motion vectors. More importantly, it infers that pixels within the virtual base layer MB have to share the same prediction type, i.e., either all inter-predicted or all intra-predicted.

According to various embodiments of the present invention, the concept of a virtual base layer MB is still maintained. Therefore, a prediction is based on the virtual base layer MB for the areas of an enhancement layer MB that are covered with inter-coded MBs from the base layer. For areas of the enhancement layer MB that are covered by intra-coded MBs from the base layer, the prediction is based on the corresponding reconstructed and upsampled values from the base layer.

Referring back to FIG. 2, assume the MB 202 is inter-coded, the MB 204 is intra-coded, and the MB 208 is covered by both the MB 202 and the MB 204. According to various embodiments of the present invention, a virtual base layer MB is formed with an inter-coded MB type. Then residual prediction is performed to get a prediction as described above. However, since the right section of the MB 208 is covered by the intra-coded MB 204 from the base layer 200, according to various embodiments of the present invention, the prediction values for this section of the MB 208 are the corresponding reconstructed and upsampled values from the MB 204.

Therefore, in practice, a normal prediction can be first performed based on the derived virtual base layer MB. Then a further check is performed to see if any area(s) of the given enhancement layer MB is covered by intra-coded MBs from a base layer. If there is any such area(s), the prediction values in the area(s) are replaced with the corresponding reconstructed and upsampled values from the base layer. This modified prediction is then used as a prediction for the given enhancement layer MB.

It should be noted that in practice, alternative implementations of the present invention are possible. Referring to the example above, a first prediction based on a virtual base layer MB may be achieved for the left section of the MB 208 instead of for the entire MB 208. In this case, motion compensation for the right section of the MB 208 is omitted. Implementing an embodiment of the present invention in this way may save computation complexity.

One particular embodiment of the present invention involves using a filtering operation to alleviate any boundary effects between intra coded regions and inter-coded regions.

Figure 7:
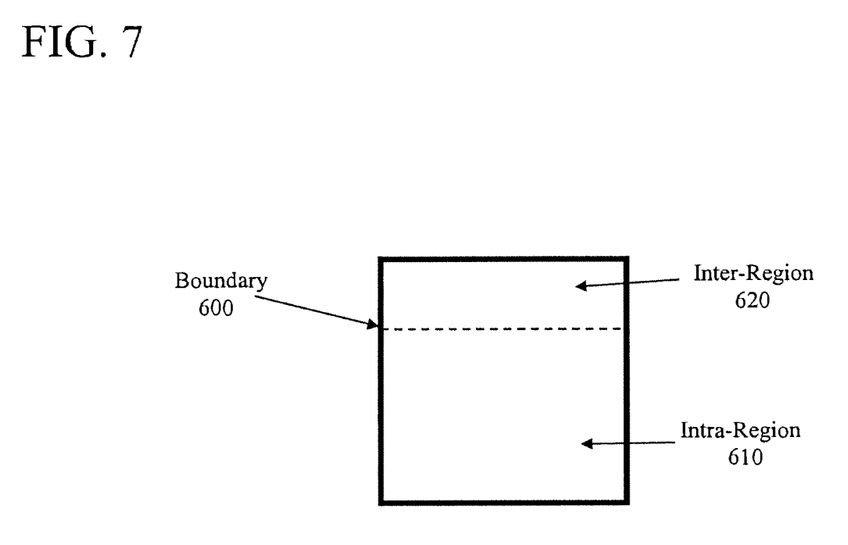
FIG. 7 is a representation showing an example enhancement layer macroblock with both an intra-coded region and an inter-coded region.

To alleviate any such boundary effects, a filtering operation is performed around the boundary along the direction that is perpendicular to the boundary. Specifically, a low pass filter is used, and the operation is performed at a number of pixel locations on each side of the boundary. An example of this process is depicted in FIG. 7. As shown in this figure, a boundary 600 between an "intra region" 610 and an "inter region" 620 is positioned horizontally and is denoted with a dashed line. In this case, low pass filtering is performed along the vertical direction at pixel locations near the edge. For example, if the number is selected to be 2, then at each pixel location that is within two pixels' distance from the boundary 600, a low-pass filtering operation is performed along the direction that's perpendicular to the boundary 600. The filter can comprise either a one-dimensional or two-dimensional filter. As long as the filtering operation possesses low pass filtering characteristics across the boundary, the boundary 600 can be smoothed. An example of such a filter is a one dimensional FIR (finite impulse response) filter with three filter taps—{0.25, 0.50, 0.25}

Given three consecutive samples as $I_{n-1}$, $I_n$, and $I_{n+1}$ along the filter direction, the filtering operation can be expressed as:

$$I'_n = f(I_{n-1}, I_n, I_{n+1}) = 0.25 * I_{n-1} + 0.5 * I_n + 0.25 * I_{n+1}$$

In this expression, $I'_n$ is the sample value after filtering operation.

It should be noted that filter selection can also be performed in an adaptive manner for the above filtering operation. For example, different filters can be selected depending on the location of pixels relative to the boundary. For pixel locations close to the boundary, a shorter filter can be used while, for pixel locations farther from the boundary, a relatively longer filter can be used. Additionally, different filters can also be selected based on other factors such as the motion vectors derived for the inter-coded region, the gradient of pixel values between the intra-coded region and the inter-coded region, etc.

In another embodiment of the present invention, boundary effects are smoothed out with a blending operation between predictions obtained for intra coded regions 610 and inter-coded regions 620. According to this embodiment, the whole macroblock is first treated as being covered solely by inter-MBs from the base layer, and a first inter-layer prediction $P_1$ can be obtained accordingly. For intra coded regions 610, a second prediction, $P_2$, is then derived using reconstructed and upsampled intra-MBs from base layer. Finally, a blending operation is performed in the intra coded region 610 between the first prediction and the second prediction. The blending operation can be interpreted as a weighted average operation expressed as follows:

$$P(i,j) = w(i,j) * P_1(i,j) + (1 - w(i,j)) * P_2(i,j)$$

In the above equation, (i,j) represents the location coordinates of a pixel within a macroblock. Different weighting factors can be applied in the blending operation for pixels at different locations. For example, for pixel locations inside the intra region but close to the boundary 600 between the intra-coded and inter-coded regions 620, a relatively high weighing factor w can be used so that the blended result is weighted more towards $P_1$. On the other hand, for pixel locations inside the intra region but far from this boundary 600, a low weighting factor w can be used so that the blended result is weighted more towards $P_2$, which is derived for the intra-coded region. As a result of this blending operation, the boundary 600 between the intra-coded region 610 and the inter-coded region 620 will be spread out, effectively smoothing the boundary 600.

In still another embodiment of the present invention, the boundary 600 of the intra coded region 610 is rounded to the nearest coding block (e.g. 4×4 block) boundary 600. Inter-layer prediction is then obtained separately for the intra coded region 610 and the inter-coded region 620. In this case, due to the fact that the boundary 600 between the intra coded region 610 and the inter-coded region 620 is aligned with the coding block boundary 600, the boundary effect can be smoothed out via a loop filter operation performed on each coding block boundary.

In a manner similar to that described with regard to the second embodiment described above, the whole macroblock is first treated as being covered solely by inter-MBs from the base layer, and a first inter-layer prediction $P_1$ can be obtained accordingly. For intra coded regions 610, a second prediction $P_2$ can then be derived using reconstructed and upsampled intra-MBs from the base layer.

As a result of the rounding operation of the intra coded region 610 to the nearest coding block boundary 600, the intra coded region 610 can be either shrunk or expanded, depending on the percentage of area covered by the intra-coded region within a coding block. For example, before the rounding operation, if the intra coded region 610 covers more than 50% of the area of a coding block, then the intra coded region 610 within that coding block is expanded so that it covers the whole coding block. In this case, inter-layer prediction for the coding block comes from the expanded version of $P_2$. Otherwise, the intra coded region 610 should be shrunk in that coding block so that the whole coding block is covered in the inter-coded region 620. In this case, the inter-layer prediction for the coding block comes from $P_1$. To expand an intra coded region 610, various extrapolation methods known in the art can be used. These extrapolation methods can comprise either linear or non-linear methods. It should be noted that, this instance, 50% is only used as an example in determining whether an intra-coded region should be shrunk or expanded. In practice, the value of this percentage can be changed. For example, a value of 0 can also be used. In this case, as long as the intra-coded region covers a certain coding block, it would be expanded to cover the whole coding block, and $P_2$ would be used as inter-layer prediction for this coding block.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the word "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   forming a first prediction value for a first portion of an enhancement layer macroblock, representing at least a portion of a video frame within a scalable bit stream, by performing a residual prediction from a first set of base layer macroblocks;
   forming a second prediction value for a second portion of the enhancement layer macroblock by deriving reconstructed and upsampled values from a second set of base layer macroblocks;
   performing a filtering operation on a boundary between the first and second portions of the enhancement layer macroblock, wherein all base layer macroblocks are treated as inter-coded base layer macroblocks for the derivation of the reconstructed and upsampled values to form a prediction value for the whole enhancement layer macroblock, and wherein the filtering operation comprises a blending operation between the first prediction value and the second prediction value; and
   encoding the enhancement layer macroblock utilizing a combination of the first and second prediction values.

2. The method of claim 1, wherein at least the first set of base layer macroblocks cover the first portion of the enhancement layer macroblock and at least the second set of base layer macroblocks cover the second portion of the enhancement layer macroblock.

3. The method of claim 1, wherein the first set of base layer macroblocks are inter-coded, and the second set of base layer macroblocks are intra-coded.

4. The method of claim 1, wherein the residual prediction is performed from both the first and second set of base layer macroblocks, forming the first prediction value for both the first and second portions of the enhancement layer macroblocks.

5. The method of claim 4, wherein the deriving of the reconstructed and upsampled values from the second set of base layer macroblocks as a second prediction occurs after the residual prediction is performed for both the first and second set of base layer macroblocks, the second prediction value replacing the first prediction value only for the second portion of the enhancement layer macroblock.

6. The method of claim 1, wherein the blending operation comprises a weighted average operation.

7. The method of claim 1, further comprising, before deriving the reconstructed and upsampled values, adjusting the boundary of the second set of intra-coded macroblocks from the base layer to the nearest coding block boundary at the enhancement layer so that the derived second prediction covers an area with its boundary aligned with the coding block boundary at the enhancement layer.

8. The method of claim 7, wherein the adjusting of the boundary of the second set of intra-coded macroblocks is based on the percentage of area that a coding block at the enhancement layer is covered by the second set of intra-coded macroblocks from the base layer.

9. A computer program product, embodied in a non-transitory computer-readable medium, comprising computer code configured to perform the processes of claim 1.

10. An encoding apparatus comprising:
    a processor; and
    a memory operatively connected to the processor and including:
       computer code for forming a first prediction value for a first portion of an enhancement layer macroblock by performing a residual prediction from a first set of base layer macroblocks;
       computer code for forming a second prediction value for a second portion of the enhancement layer macroblock by deriving reconstructed and upsampled values from a second set of base layer macroblocks;
       computer code for performing a filtering operation on a boundary between the first and second portions of the enhancement layer macroblock, wherein all base layer macroblocks are treated as inter-coded base layer macroblocks for the derivation of the reconstructed and upsampled values to form a prediction value for the whole enhancement layer macroblock, and wherein the filtering operation comprises a blending operation between the first prediction value and the second prediction value; and
       computer code for encoding the enhancement layer macroblock utilizing a combination of the first and second prediction values.

11. The encoding apparatus of claim 10, wherein at least the first set of base layer macroblocks cover the first portion of the enhancement layer macroblock and at least the second set of base layer macroblocks cover the second portion of the enhancement layer macroblock.

12. The encoding apparatus of claim 10, wherein the first set of base layer macroblocks are inter-coded, and the second set of base layer macroblocks are intra-coded.

13. The encoding apparatus of claim 10, wherein the residual prediction is performed from both the first and second set of base layer macroblocks, forming the first prediction value for both the first and second portions of the enhancement layer macroblocks.

14. The encoding apparatus of claim 13, wherein the deriving of the reconstructed and upsampled values from the second set of base layer macroblocks as a second prediction occurs after the residual prediction is performed for both the first and second set of base layer macroblocks, the second prediction value replacing the first prediction value only for the second portion of the enhancement layer macroblock.

15. The encoding apparatus of claim 10, wherein the blending operation comprises a weighted average operation.

16. The encoding apparatus of claim 10, further comprising, before deriving the reconstructed and upsampled values, adjusting the boundary of the second set of intra-coded macroblocks from the base layer to the nearest coding block boundary at the enhancement layer so that the derived second prediction covers an area with its boundary aligned with the coding block boundary at the enhancement layer.

17. The encoding apparatus of claim 16, wherein the adjusting of the boundary of the second set of intra-coded macroblocks is based on the percentage of area that a coding block at the enhancement layer is covered by the second set of intra-coded macroblocks from the base layer.

18. An apparatus, comprising:
means for forming a first prediction value for a first portion of an enhancement layer macroblock by performing a residual prediction from a first set of base layer macroblocks;
means for forming a second prediction value for a second portion of the enhancement layer macroblock by deriving reconstructed and upsampled values from a second set of base layer macroblocks;
means for performing a filtering operation on a boundary between the first and second portions of the enhancement layer macroblock, wherein all base layer macroblocks are treated as inter-coded base layer macroblocks for the derivation of the reconstructed and upsampled values to form a prediction value for the whole enhancement layer macroblock, and wherein the filtering operation comprises a blending operation between the first prediction value and the second prediction value; and
means for encoding the enhancement layer macroblock utilizing a combination of the first and second prediction values.

19. A method comprising:
receiving a scalable bit stream comprising an enhancement layer macroblock representing at least a portion of a video frame;
deriving a first prediction value for a first portion of the enhancement layer macroblock by performing a residual prediction from a first set of base layer macroblocks;
deriving a second prediction value for a second portion of the enhancement layer macroblock formed from reconstructed and upsampled values of a second set of base layer macroblocks; and
decoding the enhancement layer macroblock utilizing a combination of the first and second prediction values,
wherein a boundary between the first and second portions of the enhancement layer macroblock has undergone a filtering operation that comprises a blending operation between the first prediction value and the second prediction value, wherein all base layer macroblocks are treated as inter-coded base layer macroblocks during derivation of the reconstructed and upsampled values to derive a prediction value for the whole enhancement layer macroblock, and wherein the filtering operation.

20. The method of claim 19, wherein at least a first set of base layer macroblocks cover the first portion of the enhancement layer macroblock and at least a second set of base layer macroblocks cover the second portion of the enhancement layer macroblock.

21. The method of claim 20, wherein the first set of base layer macroblocks are inter-coded, and the second set of base layer macroblocks are intra-coded.

22. A computer program product, embodied in a non-transitory computer-readable medium, comprising computer code configured to perform the processes of claim 19.

23. A decoding apparatus comprising:
a processor; and
a memory operatively connected to the processor and including:
computer code for receiving a scalable bit stream comprising an enhancement layer macroblock representing at least a portion of a video frame;
computer code for deriving a first prediction value for a first portion of the enhancement layer macroblock by performing a residual prediction from a first set of base layer macroblocks;
computer code for deriving a second prediction value for a second portion of the enhancement layer macroblock formed from reconstructed and upsampled values of a second set of base layer macroblocks; and
computer code for decoding the enhancement layer macroblock utilizing a combination of the first and second prediction values,
wherein a boundary between the first and second portions of the enhancement layer macroblock has undergone a filtering operation that comprises a blending operation between the first prediction value and the second prediction value, wherein all base layer macroblocks are treated as inter-coded base layer macroblocks during derivation of the reconstructed and upsampled values to derive a prediction value for the whole enhancement layer macroblock, and wherein the filtering operation.

24. The decoding apparatus of claim 23, wherein at least a first set of base layer macroblocks cover the first portion of the enhancement layer macroblock and at least a second set of base layer macroblocks cover the second portion of the enhancement layer macroblock.

25. The decoding apparatus of claim 24, wherein the first set of base layer macroblocks are inter-coded, and the second set of base layer macroblocks are intra-coded.

26. The decoding apparatus of claim 23, wherein the boundary that has undergone the filtering operation is between the inter-coded base layer macroblocks and the intra-coded base layer macroblocks.

27. An apparatus, comprising:
means for receiving a scalable bit stream comprising an enhancement layer macroblock representing at least a portion of a video frame:
means for deriving a first prediction value for a first portion of the enhancement layer macroblock by performing a residual prediction from a first set of base layer macroblocks;
means for deriving a second prediction value for a second portion of the enhancement layer macroblock formed from reconstructed and up sampled values of a second set of base layer macroblocks; and means for decoding the enhancement layer macroblock utilizing a combination of the first and second prediction values, wherein a boundary between the first and second portions of the enhancement layer macroblock has undergone a filtering operation that comprises a blending operation between the first prediction value and the second prediction value, wherein all base layer macroblocks are treated as inter-coded base layer macroblocks during derivation of the reconstructed and upsampled values to derive a prediction value for the whole enhancement layer macroblock, and wherein the filtering operation.

28. The apparatus of claim 27, wherein the boundary that has undergone the filtering operation is between the inter-coded base layer macroblocks and the intra-coded base layer macroblocks.

* * * * *

UNITED STATES PATENT AND TRADEMARK OFFICE
CERTIFICATE OF CORRECTION

PATENT NO. : 8,422,555 B2
APPLICATION NO. : 11/775129
DATED : April 16, 2013
INVENTOR(S) : Wang et al.

Page 1 of 1

It is certified that error appears in the above-identified patent and that said Letters Patent is hereby corrected as shown below:

In the Specification:

Column 9,
Line 53, "filter taps—{0.25, 0.50, 0.25}" should read --filter taps--{0.25, 0.50, 0.25}.--.

In the Claims:

Column 15,
Line 1, "up sampled values" should read --upsampled values--.

Signed and Sealed this
Twenty-fourth Day of September, 2013

Teresa Stanek Rea
*Deputy Director of the United States Patent and Trademark Office*